US008966890B2

(12) United States Patent
Mather et al.

(10) Patent No.: US 8,966,890 B2
(45) Date of Patent: Mar. 3, 2015

(54) METHOD AND ARRANGEMENT FOR ACTIVE MAKE-UP IN AN OVERRUNNING ACTUATOR

(75) Inventors: Daniel T. Mather, Lockport, IL (US); Troy A. Shawgo, Forsyth, IL (US); Daniel H. Killion, Blaine, MN (US); Vishnu Irigireddy, Lexington, SC (US); Deepak Amaravadi, Forsyth, IL (US); Dayao Chen, Bolingbrook, IL (US); Matthew Hempel, Urbandale, IA (US); Kenneth A. Dust, Downers Grove, IL (US); Ryan M. Ludwig, Washington, IL (US); Alfred J. Abraham, Decatur, IL (US); Michael E. Nesbitt, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 694 days.

(21) Appl. No.: 13/194,358

(22) Filed: Jul. 29, 2011

(65) Prior Publication Data

US 2013/0025271 A1 Jan. 31, 2013

(51) Int. Cl.
*F16D 31/02* (2006.01)
*F15B 7/00* (2006.01)

(52) U.S. Cl.
CPC .................................... *F15B 7/001* (2013.01)
USPC ................................ 60/428; 60/421; 60/486

(58) Field of Classification Search
USPC .................................. 60/421, 428, 430, 486
See application file for complete search history.

(56) References Cited

U.S. PATENT DOCUMENTS

| | | | | |
|---|---|---|---|---|
| 3,415,169 | A | 12/1968 | Naddell | |
| 3,910,044 | A | 10/1975 | Symmank | |
| 4,561,341 | A | 12/1985 | Aikawa | |
| 5,335,926 | A * | 8/1994 | Stolle | 296/117 |
| 6,018,895 | A | 2/2000 | Duppong et al. | |
| 6,244,048 | B1 | 6/2001 | Tanaka et al. | |
| 6,692,088 | B1 * | 2/2004 | Zheng | 303/113.1 |
| 6,739,127 | B2 | 5/2004 | Nippert et al. | |
| 7,475,502 | B2 | 1/2009 | Bösebeck et al. | |
| 7,500,360 | B2 | 3/2009 | Udagawa et al. | |
| 8,051,651 | B2 | 11/2011 | Cochran et al. | |
| 2007/0079609 | A1 * | 4/2007 | Brinkman et al. | 60/413 |
| 2008/0238180 | A1 * | 10/2008 | Kraenzle | 298/11 |
| 2009/0308067 | A1 | 12/2009 | Meier et al. | |
| 2010/0071359 | A1 | 3/2010 | Kure et al. | |

FOREIGN PATENT DOCUMENTS

| | | | |
|---|---|---|---|
| DE | 10064542 | A1 | 6/2002 |

* cited by examiner

*Primary Examiner* — Edward Look
*Assistant Examiner* — Daniel Collins
(74) *Attorney, Agent, or Firm* — Leydig, Voit & Mayer, Ltd.

(57) ABSTRACT

A hydraulic system having an actuator having a piston and associated rod forming head and rod chambers and being adapted to move between retracted and extended positions within a cylinder, and first and second sources of fluid. A first pump provides fluid from the first source to the head chamber at a first pressure. At least one valve provides fluid from the second source at a second pressure to supplement fluid provided to the head chamber from the first pump when the second pressure is greater than the first pressure.

20 Claims, 5 Drawing Sheets

METHOD AND ARRANGEMENT FOR ACTIVE MAKE-UP IN AN OVERRUNNING ACTUATOR

TECHNICAL FIELD

This disclosure relates generally to a hydraulic circuit for a double acting actuator, and, more particularly to arrangements for active fluid make-up in an overrunning actuator.

BACKGROUND

Dumping the load of a truck preferably occurs as a gradual evacuation. With certain materials, however, such as the materials collected from the Canadian oil sands, the contents of the bed can adhere together, and dump as a single unit, or a small number of relatively large units. This phenomenon is referred to as loafing.

The dumping of a load is accomplished by way of a plurality of actuators. In viewing the structure of an actuator, a rod extends from the one side of the piston and outward from the cylinder. When dumping, the actuators extend, that is, hydraulic fluid is evacuated from the rod chamber of the actuator and hydraulic fluid is moved to the head chamber. As a bed is moved to start the dumping motion, the force of the load acts to compress the actuators. As the load continues to shift toward the dumping end of the bed, however, a situation occurs that is commonly referred to as an overrunning load if the load does not proceed gradually to dump from the bed. That is, if the load acts as a loaf, the force of the shifting load causes a moment that exerts a force on the actuator in the extending direction of the actuator.

If the flow of fluid to the head chamber is inadequate to meet the demands of the forcibly extending actuator, an undesirable severe voiding results in the head end of the actuator. In other words, a vacuum develops in the head chamber as the volume of the head chamber extends beyond the volume of the hydraulic fluid flowing to the head chamber. As a result, when the load drops from the bed as a loaf, the vacuum formed in the head chamber causes the actuator to rapidly retract. This significant and undesirable dynamic event can result in discomfort, and even injury to a machine operator, or damage to the machine.

In prior art arrangements, a hydraulic tank is provided as an external source of make-up flow to the hoist valve of the actuator. Unfortunately, however, this passive arrangement is often inadequate to meet the needs of an overrunning actuator, and an alternative solution is desirable.

SUMMARY

In one aspect, there is disclosed a hydraulic system comprising an actuator having a piston disposed within a cylinder, and a rod extending from the piston and extending out of the cylinder. The piston defines a rod chamber and a head chamber within the cylinder. The piston and rod is adapted to move between a retracted position and an extended position. The hydraulic system also includes a first source of hydraulic fluid, and a first pump adapted to provide hydraulic fluid from the first source to the head chamber. The hydraulic fluid from the first pump is provided to the head chamber at a first pressure Ph. The hydraulic system also includes a second source of hydraulic fluid, and at least one selectively actuatable valve fluidly coupled to the second source. The second source is adapted to provide hydraulic fluid at a second pressure Pb. The at least one valve provide hydraulic fluid from the second source to supplement hydraulic fluid provided to the head chamber from the first pump when the second pressure Pb is greater than the first pressure Ph.

In another aspect, there is disclosed a machine for hauling a load. The machine comprises a chassis, and a bed pivotably mounted to the chassis and adapted to pivot between first position and a second position. The bed is disposed to hold a load in the first position, and to dump the load in the second position. The machine also includes a hydraulic system having an actuator, first and second sources of hydraulic fluid, a first pump, and at least one selectively actuatable valve. The actuator has a piston disposed within a cylinder, and a rod extending from the piston and extending out of the cylinder. The piston defines a rod chamber and a head chamber within the cylinder. The actuator being adapted to move between a retracted position and an extended position. The actuator being coupled to the chassis and the bed and disposed to move to the extended position to pivot the bed between the first and second positions. The first pump is adapted to provide hydraulic fluid from the first source to the head chamber at a first pressure Ph. The second source of hydraulic fluid is adapted to provide hydraulic fluid at a second pressure Pb. The at least one valve is fluidly coupled to selectively provide hydraulic fluid from the second source to supplement hydraulic fluid provided to the head chamber from the first pump when the second pressure Pb is greater than the first pressure Ph.

In yet another aspect, there is disclosed a method of controlling a hydraulic system in a machine for hauling a load. The machine comprises a chassis with a bed pivotably mounted to the chassis and adapted to pivot between first position wherein the bed is disposed to hold a load and a second position wherein the bed is disposed to dump the load. The machine additionally includes a hydraulic system having an actuator, a first source of hydraulic fluid, and a a first pump. The actuator has a piston disposed within a cylinder, and a rod extending from the piston and extending out of the cylinder. The piston defines a rod chamber and a head chamber within the cylinder. The actuator is adapted to move between a retracted position and an extended position, the actuator being coupled to the chassis and the bed and disposed to move from the retracted position to the extended position to pivot the bed between the first and second positions. The first pump is adapted to provide hydraulic fluid from the first source to the head chamber. Hydraulic fluid from the first pump is provided to the head chamber at a first pressure Ph. The method comprising the steps of selectively fluidly coupling a second source of hydraulic fluid to at least one valve and the head chamber, and actuating the at least one valve to provide flow at a second pressure Pb from the second source to supplement hydraulic fluid provided to the head chamber from the first pump when the second pressure Pb is greater than the first pressure Ph.

BRIEF DESCRIPTION OF THE DRAWING(S)

DETAILED DESCRIPTION

Figure 1:
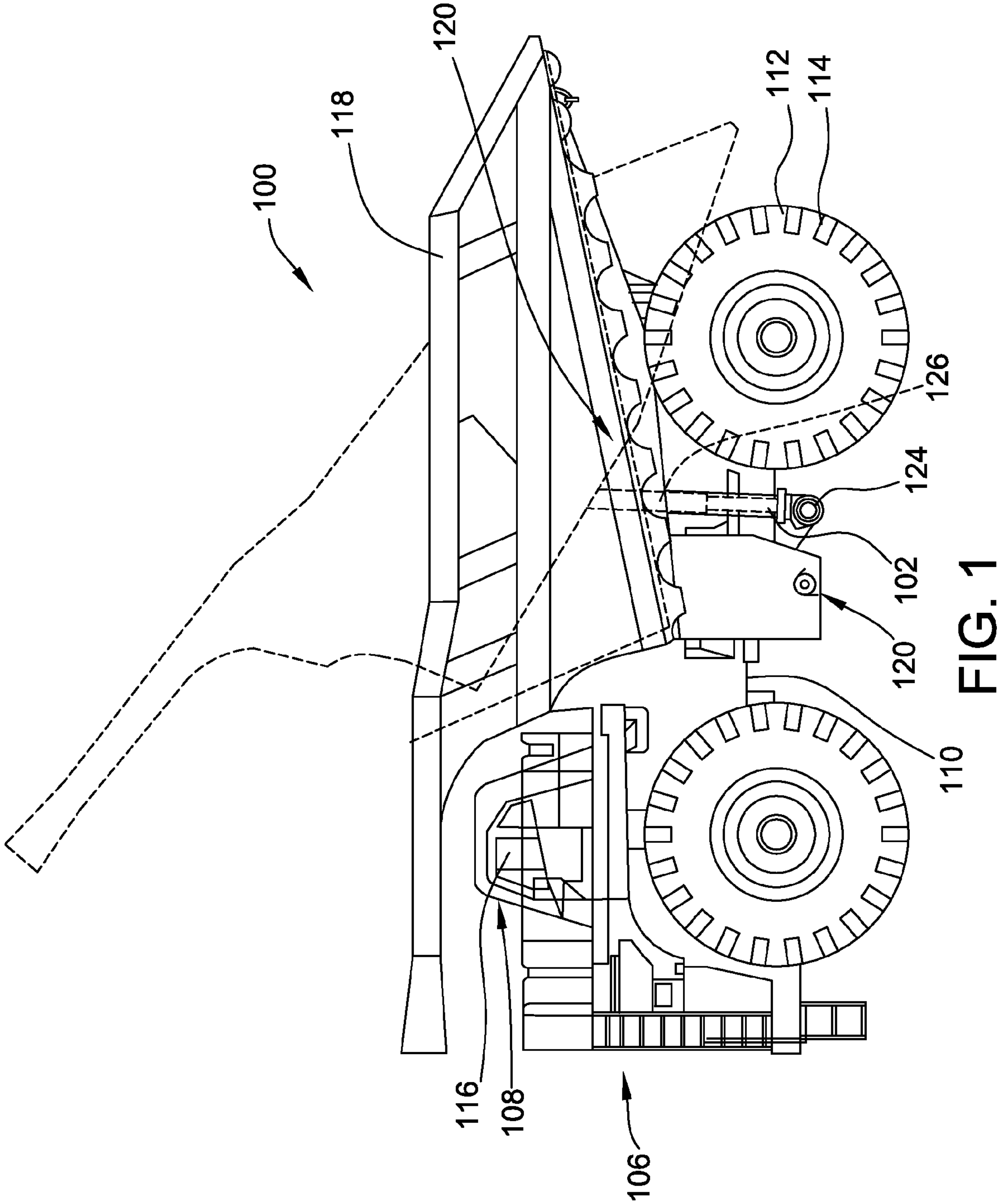
FIG. 1 is a side elevational view of a machine incorporating aspects of this disclosure.

The truck 106 of FIG. 1 includes a cab 108 that is supported on a chassis 110 that includes motivators 112, such as wheels

114. It will be appreciated, however, that the motivators 112 may alternately be a pair of tracks, or the like. The cab 108 includes an operator station 116 from which an operator may control the operations of the machine 100.

The chassis 110 additionally supports a bed 118 that is pivotably supported on the chassis 110 at pivot location (shown generally as 120). It is noted that the bed 118 may include a dumping gate (not illustrated) that pivots out of position to allow a load contained within the bed 118 to dump from the bed 118 when the bed 118 is tilted. An alternate arrangement, such as the one illustrated need not include such a gate.

The machine 100 additionally includes components of a hydraulic system 122, including hydraulic actuators 102. Although only one hydraulic actuator 102 is visible in FIG. 1, the illustrated hydraulic system 122 includes a plurality of hydraulic actuators 102 that may be extended to cause the bed 118 to pivot around pivot location 120 to dump a load. As is conventional, the hydraulic actuators 102 are pivotably coupled to the chassis 110 at one end 124, and to the bed 118 at the other end 126.

Figure 2:
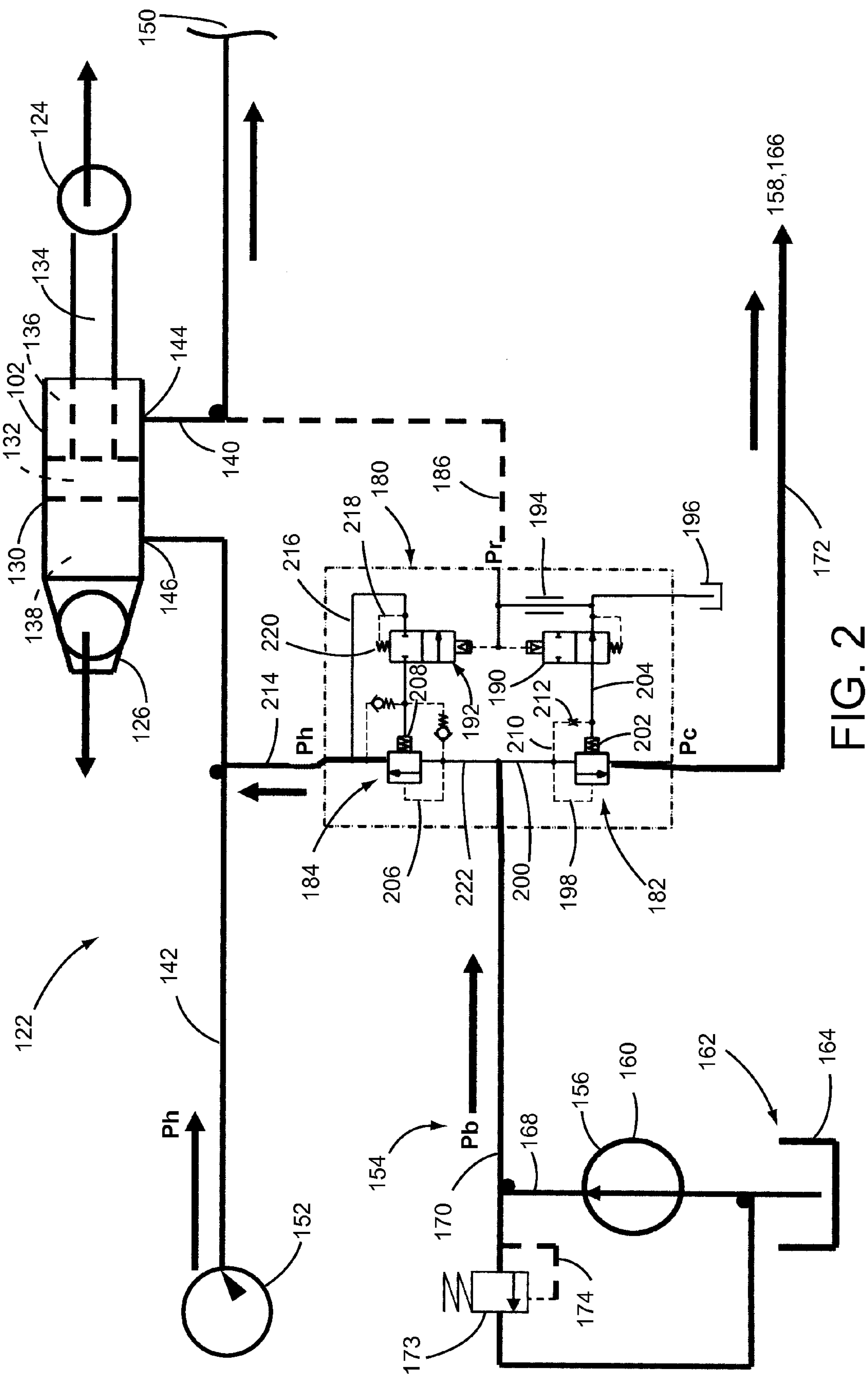
FIG. 2 is a fragmentary schematic view of a hydraulic system according to a first embodiment of this disclosure.

Referring to FIG. 2, which shows a fragmentary schematic of an embodiment of the hydraulic system 122 for operating the actuator 102, the actuators 102 may be of a conventional design, including a cylinder 130 in which a piston 132 is slidably disposed. A rod 134 is secured to the piston 132, and extends from the cylinder 130. In this way, the piston 132 divides the interior of the cylinder 130 into a rod chamber 136 and a head chamber 138. In operation, as the actuator 102 is extended, hydraulic fluid flows out of the rod chamber 136 and hydraulic fluid flows into the head chamber 138 as the piston 132 and rod 134 slide within the cylinder 130 to telescope the rod 134 outward from the actuator 102. Conversely, as the actuator 102 is retracted, hydraulic fluid flows into the rod chamber 136 and hydraulic fluid flows out of the head chamber 138 as the piston 132 and rod 134 slide within the cylinder 130 to retract the rod 134 into the cylinder 130. The actuator 102 may include, for example, a one or a two stage rod, although a single stage rod 134 is illustrated in this embodiment. Flow of hydraulic fluid to and from the rod and head chambers 136, 138 proceeds through a rod side fluid connection 140 and a head side fluid connection 142, respectively, that are fluidly coupled to respective ports 144, 146 opening in the rod or head chambers 136, 138 in the cylinder 130. In an embodiment of a machine such as illustrated in FIG. 1, the ports 144, 146 may be both located at the rod end of the 124 of the actuator 102, flow to the head chamber 138 progressing through a pipe (not shown) contained in the rod 134. Ports 144, 146 also may be provided in opposite ends of the actuator 102, as illustrated in FIG. 2. To dump a load contained within the bed 118, the actuators 102 are extended to pivot the bed 118 about the pivot location 120 by evacuating fluid from the rod chamber 136 and adding fluid to the head chamber 138. During extension of the actuator 102, fluid under pressure is evacuated from the rod chamber 136 through the port 144 and rod side fluid connection 140 to, for example, a hoist valve 150. Simultaneously, lower pressure fluid flows from a first pump 152 through the head side fluid connection 142 and the port 146 to the head chamber 138.

According to an embodiment of this disclosure, supplemental flow is provided to the head chamber 138 from an additional source 154 of pressurized fluid. In this embodiment, supplemental flow is provided from an existing pump 156 of an alternate hydraulically operated function or operation 158 that can tolerate an interruption in flow during the hoisting operation. In this embodiment, the flow is provided from a cooling pump 160, which, during normal operation, pumps hydraulic fluid from a fluid source 162, such as a sump 164, to an oil cooler 166, by way of a plurality of conduits 168, 170, 172. It is noted that when fluid in conduit 170 reaches a preset pressure, poppet valve 173 may be triggered by a pilot control line 174 to allow fluid to be returned to the fluid source 162.

In order to control the flow of fluid from the pump 156 to the actuator 102 or the alternate operation 158, a diverter valve 180 is provided. In this embodiment, the diverter valve is pilot operated and includes first and second poppet valves 182, 184. Flow from the additional source 154, here, the pump 156, is provided through conduit 170 to poppet valves 182, 184, which are both normally in their closed positions, as illustrated in FIG. 2. Fluid pressure provided to the poppet valves 182, 184 will be at pressure Pb, that is, the pressure Pb as fluid leaves the pump 156 and travels along conduit 170.

In operation, a pilot signal is provided by way of pilot line 186 from the rod side fluid connection 140 connected to the rod chamber 136. The pilot line 186 is coupled to a pair of pilot valves 190, 192, valve 190 being normally open, and valve 192 being normally closed. In this way, pressure from the rod side fluid connection 140 is provided as pressure Pr to valves 190, 192, that is, the pressure Pr of the fluid leaving the rod side chamber 136 and traveling through conduit 140.

In operation, if pressure Pr provided to pilot line 186 from the rod side fluid connection 140 is relatively low, pilot valve 190 remains in the open position, and pilot valve 192 remains in a closed position. A bleed orifice 194 allows any residual pressure in the pilot line 186 to vent to a drain 196. It is noted that drain 196 and sump 164 may be the same structure or otherwise connected. With the pilot valve 190 in the open position as illustrated, when pressure Pb builds in conduit 170, a pilot line 198 from conduit 200 extending from conduit 170 applies pressure Pb to the poppet valve 182 to move the poppet valve 182 from the illustrated closed position to an open position. As the poppet valve 182 moves from the closed to the open position against the force of a spring 202, pressure within line 204 is vented through the pilot valve 190 to the drain 196.

Turning to the poppet valve 184, with the pilot valve 192 in the closed position, pressure on the backside of the poppet valve 184 is unable to vent, and pilot line 206 does not move the poppet valve 184 to an open position against the force of spring 208. As a result, all of the flow from conduit 170 proceeds to conduit 200, flowing through open poppet valve 182 to conduit 172, and on to the alternate operation 158, here, an oil cooler 166. It will be appreciated by those of skill in the art that the structure various acting surfaces of the valves 182, 184 may be designed such that the force of fluid on the surfaces results in movement providing the desired flow direction.

As the pressure Pr within pilot line 186 builds, however, pilot valve 190 shifts to its closed position, terminating the vent from line 204 to the drain 196, but continuing to allow venting to drain 196 through orifice 194. With pilot valve 190 in the closed position, pressure Pb from conduit 200 additionally is transmitted through pilot line 210 and orifice 212 such that the forces, including that of the spring 202, move the poppet valve 182 to the illustrated closed position, shutting off flow to the alternate operation 158, i.e., the oil cooler 166.

As pressure continues to build, the pilot valve 192 is also shifted from its normally closed position illustrated to its open position, connecting the backside of the poppet valve 184 to conduit 214 by way of line 216. It will be appreciated that pressure Ph from the first pump 152 is applied to one side of the pilot valve 192 by way of conduits 142, 214, line 216, and pilot line 218. In this way, pressure Ph, which is the pressure Ph of fluid leaving the first pump 152 and traveling through head side fluid connection 142, along with the force of biasing spring 220 act on one end of the pilot valve 192, while pressure Pr from pilot line 186 acts on the other side of pilot valve 192. Here, pressure Pr from pilot line 186 is the same as pressure exiting the rod chamber 136 and traveling through the rod side fluid connection 140. Thus, when Pr exceeds Ph, pilot valve 192 shifts from the closed to the open position.

With the pilot valve 192 in the open position, as pressure Pb from the alternate source 154 increases, pressure Pb is applied to the poppet valve 184 through conduits 170, 222 and pilot line 206. As pressure Pb builds, the pressure Pb asserted on poppet valve 184, including by way of conduit 222 and pilot line 206, overcomes the pressure Ph from the first pump 152 asserted on the poppet valve 184. The poppet valve 184 then moves from the closed position illustrated to the open position, connecting flow from conduit 222 to conduit 214 to provide flow supplemental to the head chamber 138 by way of conduit 142 and port 146. This flow to the head chamber 138 from the first pump 152 and the supplemental source 154 is a relatively high flow at a relatively low pressure, while the flow from the rod chamber 136 is at a relatively high pressure, providing maximum tension force in the cylinder 130. It will be appreciated by those of skill in the art, that this supplemental flow to the head chamber 138 provides fluid to the void that may otherwise be created in the head chamber 138 as a result of an overrunning situation.

Figure 3:
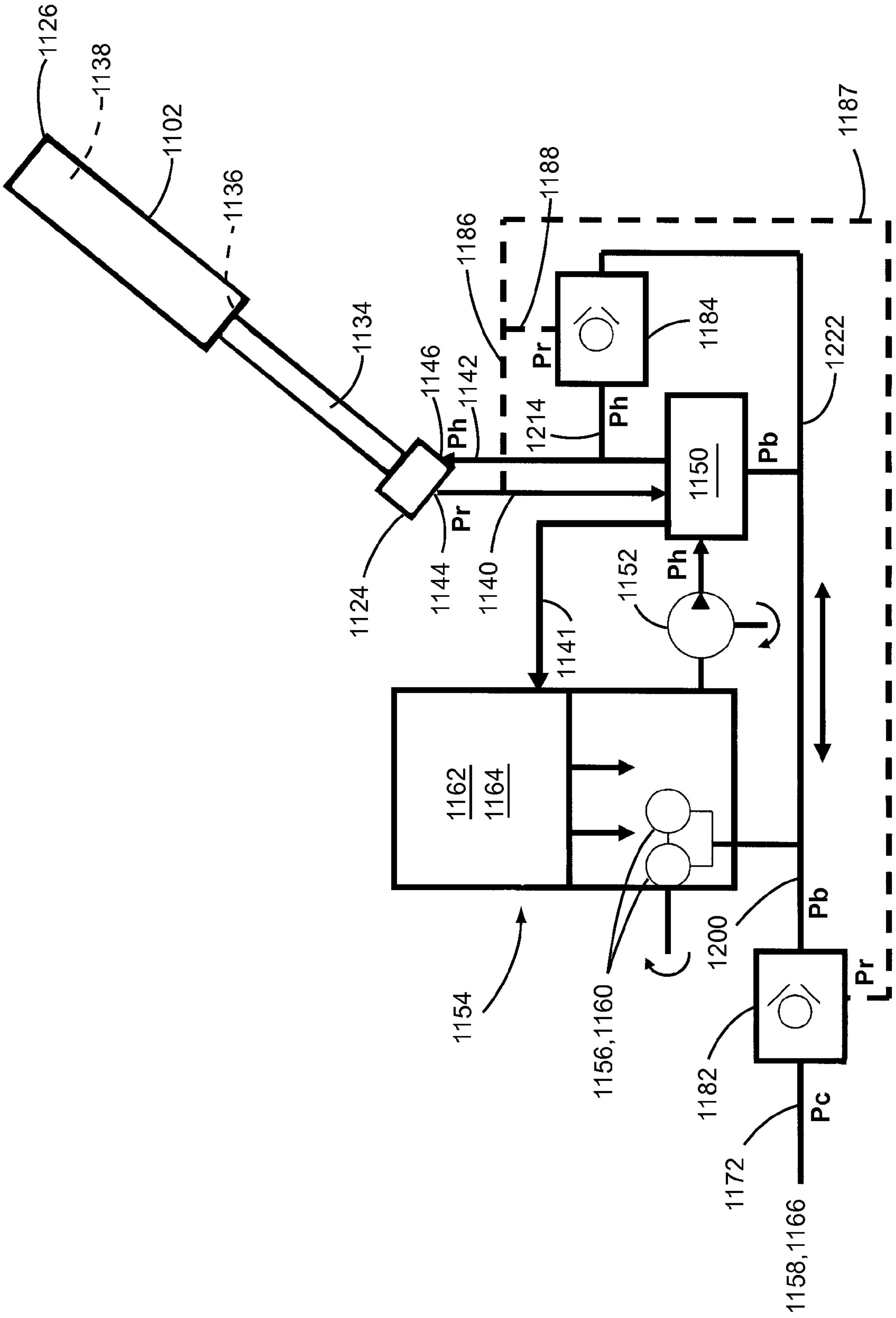
FIG. 3 is a fragmentary schematic view of a hydraulic system according to a second embodiment of this disclosure.

Turning now to the embodiment of FIG. 3, the same numbers preceded by the number 1XXX are utilized to identify the various elements. Those elements identified by such corresponding numbers in FIG. 3 that are not explained in detail below may be the same or similar to the structure explained with regard to FIG. 2. It is noted, however, that flow of hydraulic fluid to and from the rod and head chambers 1136, 1138 proceeds through a rod side fluid connection 1140 and a head side fluid connection 1142, respectively, but the respective ports 1144, 1146 opening in the rod or head chambers 1136, 1138 are both disposed in the rod end 1124 of the actuator 1102, flow to the head chamber 1138 progressing through a pipe (not shown) contained in the rod 1134. As with the first embodiment, to dump a load contained within the bed 118, the actuator 1102 is extended by evacuating fluid from the rod chamber 1136 and adding fluid to the head chamber 1138.

During extension of the actuator 1102, fluid under pressure is evacuated from the rod chamber 1136 through the port 1144 and rod side fluid connection 1140 to a hoist valve 1150, from which the fluid may be directed, for example, to a tank 1164 via conduit 1141. Simultaneously, a first pump 1152 pumps lower pressure fluid through the hoist valve 1150 to the head side fluid connection 1142 and the port 1146 to the head chamber 1138.

According to this embodiment, supplemental flow is provided to the head chamber 1138 from the fluid source 1162, or tank 1164 from an additional fluid source (shown generally as 1154) by way at least one existing pump 1156 from an alternate operation 1158 that can tolerate an interruption in flow during the hoisting operation. In this embodiment, flow is provided from a pair of cooling pumps 1160 that service the rear brakes 1166. In this embodiment, low and high pressure valves 1182, 1184 may be provided separately, as opposed to being contained in a single diverter valve 180, such as the one illustrated in the embodiment of FIG. 2.

As with the first embodiment, flow from the additional source 1154, here, the pumps 1156, is provided through conduit 1170 to low and high pressure poppet valves 1182, 1184 by way of conduits 1200, 1222, respectively. Fluid pressure provided to the poppet valves 1182, 1184 by way of conduits 1200, 1222 will be at pressure Pb, that is, the pressure of the hydraulic fluid leaving existing pumps 1156 and traveling through conduit 1200.

A pilot connection 1186 from the rod connection 1140 connected to the rod chamber 1136 provides pressure Pr to the poppet valves 1182, 1184 by way of pilot connections 1187, 1188. Pressure Pr in this embodiment is the pressure of fluid leaving the rod chamber 1136 and traveling through the rod side fluid connection 1140. As with the poppet valves 182, 184 of FIG. 2, the high pressure poppet valve 1184 will be closed and the low pressure poppet valve 1182 will be open to provide passage of hydraulic fluid when pressure Pr provided by way of pilots 1186, 1187, 1188 is relatively low. That is, when the pressure Pr in the rod side fluid connection 1140 is low, as in normal operation, fluid from the at least one existing pump 1156 will be directed to its operation 1158 through the open low pressure poppet valve 1182, i.e., fluid from the cooling pumps 1160 will be directed from conduit 1200 through open poppet valve 1182 and conduit 1172 to the rear brakes 1166.

Conversely, when the pressure provided by the pilots 1186, 1187, 1188 is increases, the low pressure poppet valve 1182 closes and the high pressure poppet valve 1184 opens. When the pressure Pr is relatively high, the high pressure poppet valve 1184 will be open to allow passage of hydraulic fluid and the low pressure poppet valve 1182 will be closed to prevent passage. That is, when pressure Pr in the rod side fluid connection 1140 is relatively high, as during an overrunning load situation, fluid from the at least one existing pump 1156 will be directed to the head chamber 1138 through the open high pressure poppet valve 1184, i.e., fluid from the cooling pumps 1160 will be directed to the head chamber 1138 through conduit 1222, open poppet valve 1184, conduit 1214, and head side fluid connection 1142 to supplement the flow from the first pump 1152.

Figure 4:
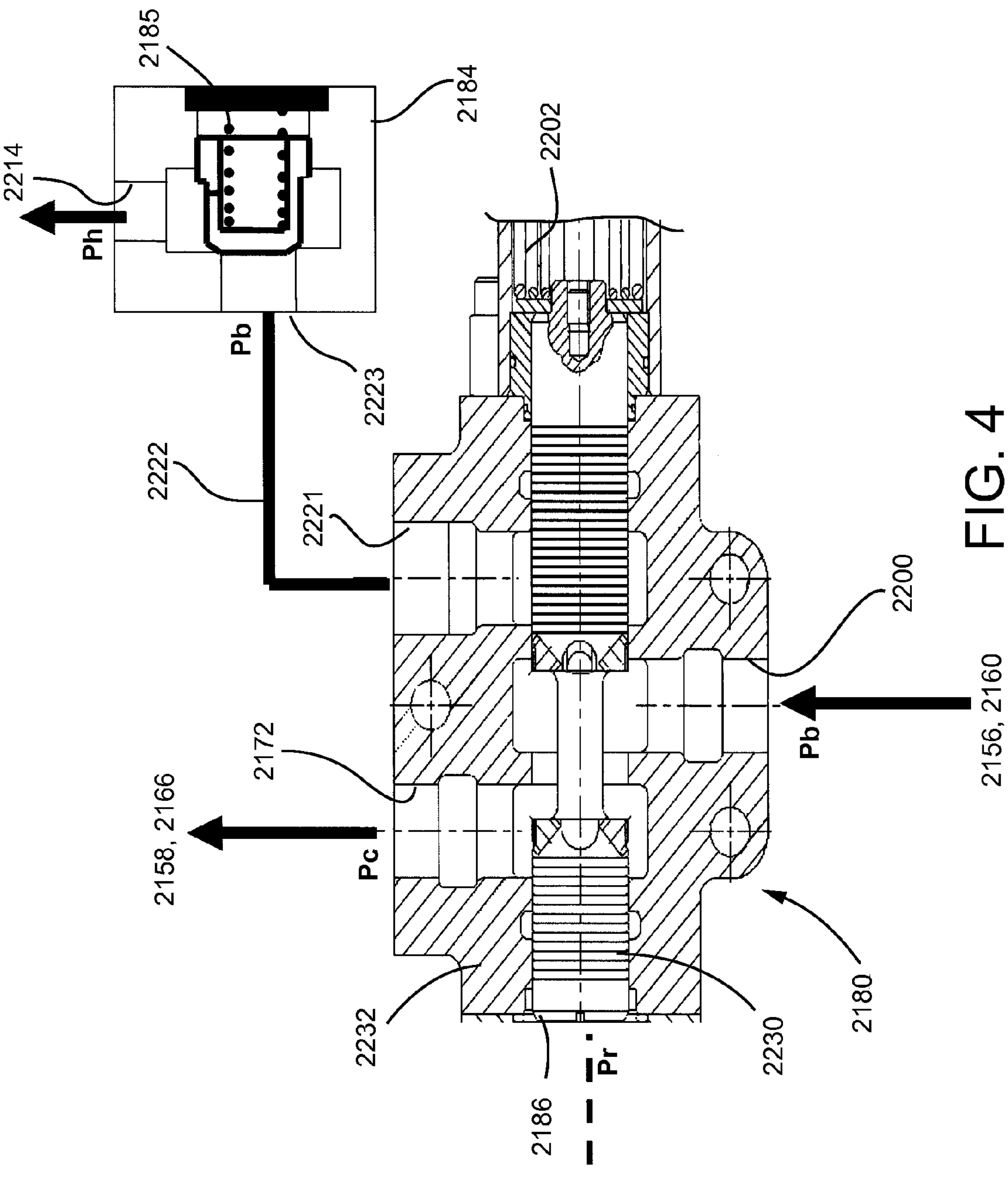
FIG. 4 is a fragmentary schematic view of a hydraulic system according to a third embodiment of this disclosure.

Turning now to FIG. 4, the same numbers preceded by the number 2XXX are utilized to identify the various elements. Those elements identified by such corresponding numbers in FIG. 4 that are not explained in detail below may be the same or similar to the structure explained with regard to FIGS. 2 and/or 3. FIG. 4 illustrates an example of a pilot valve 2180 in conjunction with a make-up valve 2184. The pilot valve 2180 is of a spool type in this embodiment, while the make-up valve 2184 is of a poppet type.

In the implementation of FIG. 4, a spool 2230 is provided within a valve body 2232, and biased to the illustrated position by spring 2202. In the position illustrated, the spool 2230 is disposed to direct flow through port 2200 from an existing pump 2156 to port 2172 and on to an alternate operation 2158, here, from a brake cooling pump 2160 to an oil cooler 2166. In this way, pressure Pb is applied at port 2200, pressure Pc is applied at port 2172, that is, the pressure Pb from the existing pump 2156 is applied at port 2200, and the pressure Pc from the alternate operation 2158 is applied at port 2172. In order to shift the spool 2230 from the illustrated position against the force of the spring 2202 and existing flow through the valve body 2232, a pilot signal of pressure Pr is applied to a spool 2230 at port 2186. Thus, when pilot pressure Pr is relatively low, the spool 2230 will be disposed in the illustrated position, directing flow from the existing pump 2156 to the alternate operation 2158. When pilot pressure Pr builds, however, the spool 2230 will shift from the illustrated position to cut off flow to the alternate operation 2158, and direct flow to the port 2221, through conduit 2222, and on to make-up valve 2184. It will be appreciated that, once in the shifted position, the pressure at port 2221 and in conduit 2222 will be the same as the pressure Pb entering the valve body 2232 at port 2200.

In this way, pressure Pb is applied at port 2223 of the make-up valve 2184. The outlet port 2214 of the make-up valve 2184 is open to the flow to the actuator (not illustrated in this embodiment). Consequently, the pressure applied at port 2214 is the pressure Ph from the first pump (not illustrated in this embodiment). As pressure Pb applied to make-up valve 2184 at port 2223 builds and eventually becomes greater than the force applied by the spring 2185 and pressure Ph, the make-up valve 2184 opens to allow flow to port 2214. That is, when make-up valve 2184 opens, flow through valve 2180 from the existing pump 2156 is directed supplement flow to the cap chamber (not illustrated in this embodiment) during an overrunning operation.

Figure 5:
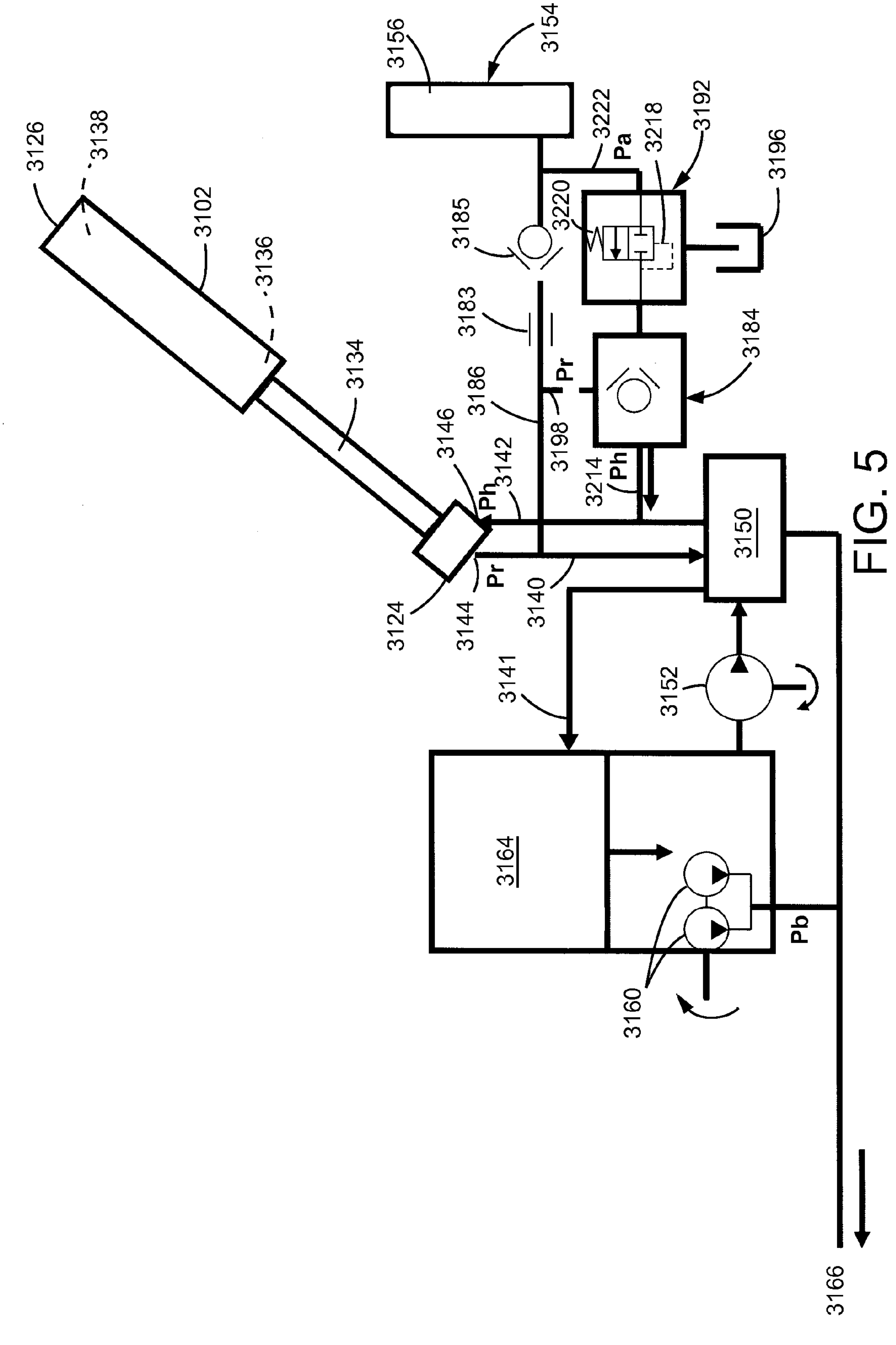
FIG. 5 is a fragmentary schematic view of a hydraulic system according to a fourth embodiment of this disclosure.

Turning now to FIG. 5, the same numbers preceded by the number 3XXX are utilized to identify the various elements. Those elements identified by such corresponding numbers in FIG. 5 that are not explained in detail below may be the same or similar to the structure explained with regard to FIG. 3. FIG. 5 illustrates an example of a regenerative system wherein an accumulator 3156 is utilized as an additional source of pressurized fluid 3154 to supplement flow from a first pump 3152. As in the embodiment of FIG. 3, the first pump 3152 directs fluid from a tank 3164 to the head chamber 3138 by way of a hoist valve 3150 and head side fluid connection 3142. It is noted that the cooling pumps 3160 in this embodiment direct fluid to the oil cooler 3166, but are not involved in the provision of supplemental fluid to the head chamber 3138.

In the embodiment of FIG. 5, return flow from the rod chamber 3136 may be directed by rod side fluid connection 3140 through the hoist valve 3150 and conduit 3141 to the tank 3164. Return flow from the rod chamber 3136 may alternatively or additionally be directed from rod side fluid connection 3140 through conduit 3186 and check valve 3185 to the accumulator 3156. A flow limiter 3183, illustrated here as a compensated orifice, may be disposed in the path of charge conduit 3186.

In operation, supplemental flow from the accumulator 3156 may be may be directed to head side fluid connection 3142 by way of operation of valves 3192 and 3184. Turning first to the operation of the valve 3184, pressure Ph from head side fluid connection 3142 is applied to valve 3184 by way of conduit 3214, while pressure Pr from rod side fluid connection 3140 as a result of flow from the rod chamber 3136 is applied to valve 3184 by way of pilot line 3188. Generally speaking, when the pilot pressure Pr at pilot line 3188 is greater than pressure resulting from flow to the head chamber 3138, valve 3184 will open to permit flow therethrough.

With valve 3184 in the open position, pressure Ph will be applied to one side of the valve 3192, while pressure Pa from the accumulator 3156 will be applied to the other side of valve 3192. When the pressure Ph from the valve 3184 applied to the valve 3192 drops, pressure applied at pilot line 3218 drops, allowing the valve 3192 to move under the force of spring 3220 from the normally closed position illustrated to an open flow position. With valve 3192 in the open position, fluid from the accumulator 3156 passes through the conduit 3222, valve 3192, valve 3184, and conduit 3214 to the head side fluid connection 3142, and on to the head chamber 3138 through port 3146. Valve 3192 may be a pressure reducing valve such that valve 3192 reduces the pressure of fluid flowing from the accumulator 3156 before passing the fluid on to valve 3184. It will be appreciated by those of skill in the art that valve 3184 and, consequently, valve 3192 will return to their respective closed position when the difference between the pressure Ph applied at conduit 3214 and the pressure Pr applied at pilot line 3188 reduces.

Industrial Applicability

The present disclosure is applicable to machines 100 that haul materials that are subject to massing together as one or more larger units. The disclosure may be particularly applicable to machines 100 which experience high forces that may result in overrunning and potential voiding in the head chamber of 138 of an actuator 102 during extension. The present disclosure may be applicable to such machines that are otherwise susceptible to rapid removal of such high forces, as may occur with “loafing” during unloading of a load. The systems and method disclosed herein may reduce or minimize the possibility of such loafing. The systems and method may also minimize or reduce the effects of such loafing on machinery components, as well as on the operator.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A hydraulic system comprising:

an actuator having a piston disposed within a cylinder, and a rod extending from the piston and extending out of the cylinder, the piston defining a rod chamber and a head chamber within the cylinder, the piston and rod being adapted to move between a retracted position and an extended position, a first source of hydraulic fluid, a first pump adapted to provide hydraulic fluid from the first source to the head chamber, hydraulic fluid from the first pump being provided to the head chamber at a first pressure, a second source of hydraulic fluid, the second source being adapted to provide hydraulic fluid at a second pressure, the second source of hydraulic fluid including an accumulator, the rod chamber being fluidly coupled to the accumulator to charge the accumulator as the piston and rod move from the retracted position to the extended position, and at least one valve fluidly coupled to selectively provide hydraulic fluid from the second source to supplement hydraulic fluid provided to the head chamber from the first pump when the second pressure is greater than the first pressure.

2. The hydraulic system of claim 1 wherein said at least one valve includes at least one of a poppet valve, a pilot operated valve, and at least two valves.

3. The hydraulic system of claim 1 further including at least one pilot line providing a third pressure from said rod chamber, and wherein the at least one valve includes a pilot operated valve operative at least in part as a result of said third pressure from said rod chamber.

4. The hydraulic system of claim 1 wherein the at least one valve includes at least two valves, at least one of said valves being a pressure reducing valve.

5. The hydraulic system of claim 1 wherein the second source includes at least one second pump, the hydraulic system further including an alternate operation, the second pump being fluidly coupled to also provide hydraulic fluid to the alternate operation.

6. The hydraulic system of claim 5 wherein the second pump does not provide hydraulic fluid to the alternate operation when providing hydraulic fluid to the head chamber.

7. A machine for hauling a load, the machine comprising:

a chassis, a bed pivotably mounted to the chassis and adapted to pivot between first position wherein the bed is disposed to hold a load and a second position wherein the bed is disposed to dump the load, and a hydraulic system according to claim 1.

8. A hydraulic system comprising:

an actuator having a piston disposed within a cylinder, and a rod extending from the piston and extending out of the cylinder, the piston defining a rod chamber and a head chamber within the cylinder, the piston and rod being adapted to move between a retracted position and an extended position, a first source of hydraulic fluid, a first pump adapted to provide hydraulic fluid from the first source to the head chamber, hydraulic fluid from the first pump being provided to the head chamber at a first pressure, a second source of hydraulic fluid, the second source being adapted to provide hydraulic fluid at a second pressure, the second source including at least one second pump including at least one brake cooling pump, at least one valve fluidly coupled to selectively provide hydraulic fluid from the second source to supplement hydraulic fluid provided to the head chamber from the first pump when the second pressure is greater than the first pressure, and an alternate operation including an oil cooler, the brake cooling pump being fluidly coupled to also provide hydraulic fluid to the oil cooler.

9. The hydraulic system of claim 8 wherein said at least one valve includes at least one of a poppet valve, a pilot valve, and at least two valves.

10. The hydraulic system of claim 8 wherein the at least one valve is a pilot operated valve, further including at least one pilot line providing a third pressure from said rod chamber, and wherein the pilot operated valve is operative at least in part as a result of said third pressure from said rod chamber.

11. The hydraulic system of claim 8 wherein the second source of hydraulic fluid including an accumulator.

12. The hydraulic system of claim 11 wherein the at least one valve includes at least two valves, at least one of said valves being a pressure reducing valve.

13. The hydraulic system of claim 8 wherein the second pump does not provide hydraulic fluid to the alternate operation when providing hydraulic fluid to the head chamber.

14. A machine for hauling a load, the machine comprising:

a chassis, a bed pivotably mounted to the chassis and adapted to pivot between first position wherein the bed is disposed to hold a load and a second position wherein the bed is disposed to dump the load, and a hydraulic system according to claim 8.

15. A hydraulic system comprising:

an actuator having a piston disposed within a cylinder, and a rod extending from the piston and extending out of the cylinder, the piston defining a rod chamber and a head chamber within the cylinder, the piston and rod being adapted to move between a retracted position and an extended position, a first source of hydraulic fluid, a first pump adapted to provide hydraulic fluid from the first source to the head chamber, hydraulic fluid from the first pump being provided to the head chamber at a first pressure, a second source of hydraulic fluid, the second source being adapted to provide hydraulic fluid at a second pressure, and at least one valve fluidly coupled to selectively provide hydraulic fluid from the second source to supplement hydraulic fluid provided to the head chamber from the first pump when the second pressure is greater than the first pressure, the at least one valve including at least one pilot operated valve.

16. The hydraulic system of claim 15 further including at least one pilot line providing a third pressure from said rod chamber, and wherein the pilot operated valve is operative at least in part as a result of said third pressure from said rod chamber.

17. The hydraulic system of claim 15 wherein the second source of hydraulic fluid is an accumulator.

18. The hydraulic system of claim 17 wherein the at least one valve includes at least two valves, at least one of said valves being a pressure reducing valve.

19. The hydraulic system of claim 17 wherein the rod chamber is fluidly coupled to the accumulator to charge the accumulator as the piston and rod move from the retracted position to the extended position.

20. A machine for hauling a load, the machine comprising:

a chassis, a bed pivotably mounted to the chassis and adapted to pivot between first position wherein the bed is disposed to hold a load and a second position wherein the bed is disposed to dump the load, and a hydraulic system according to claim 15.

* * * * *